Nov. 5, 1935.  W. UTZ  2,019,833
OCCUPANT PROPELLED VEHICLE
Filed Nov. 6, 1934   4 Sheets-Sheet 1
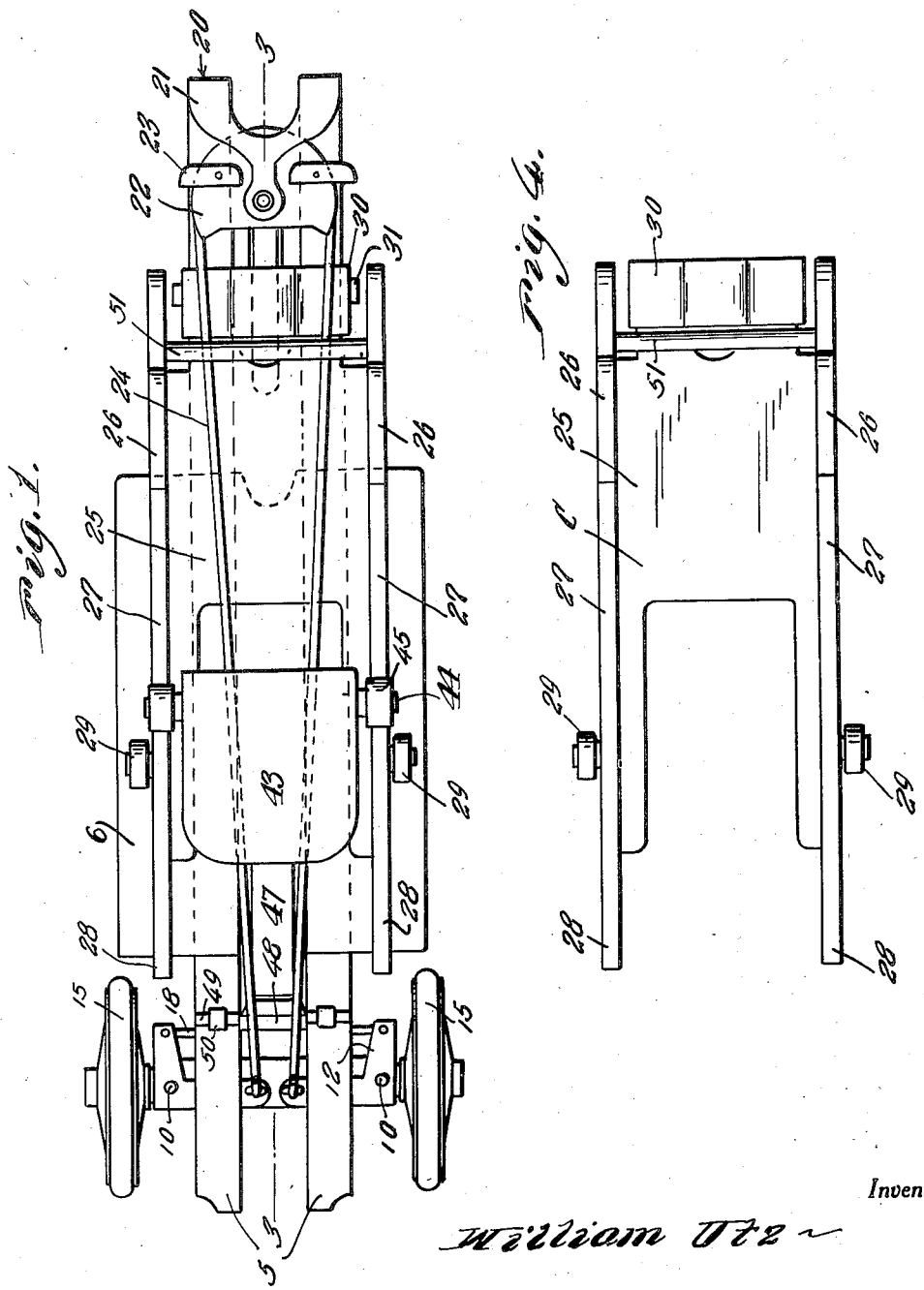

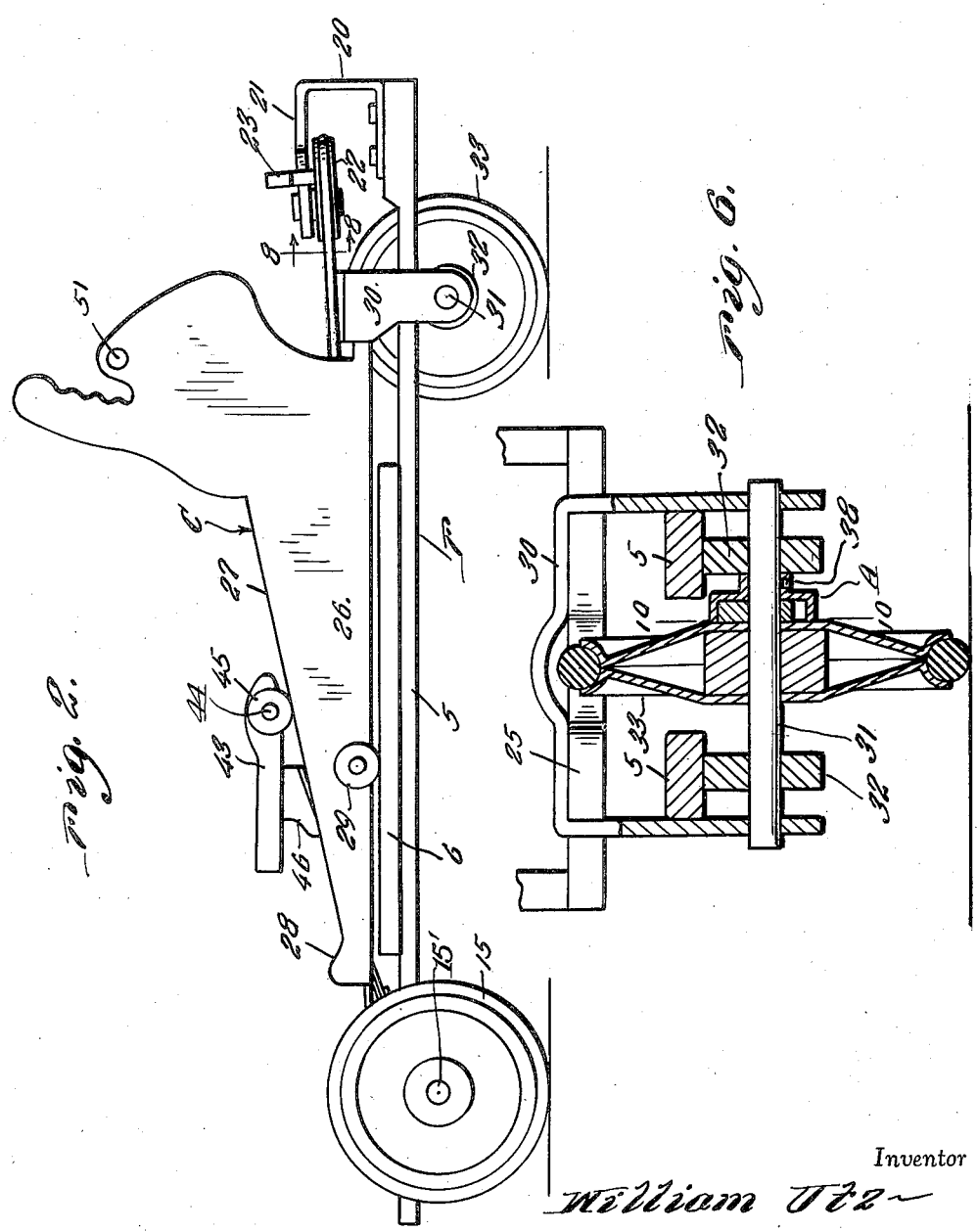

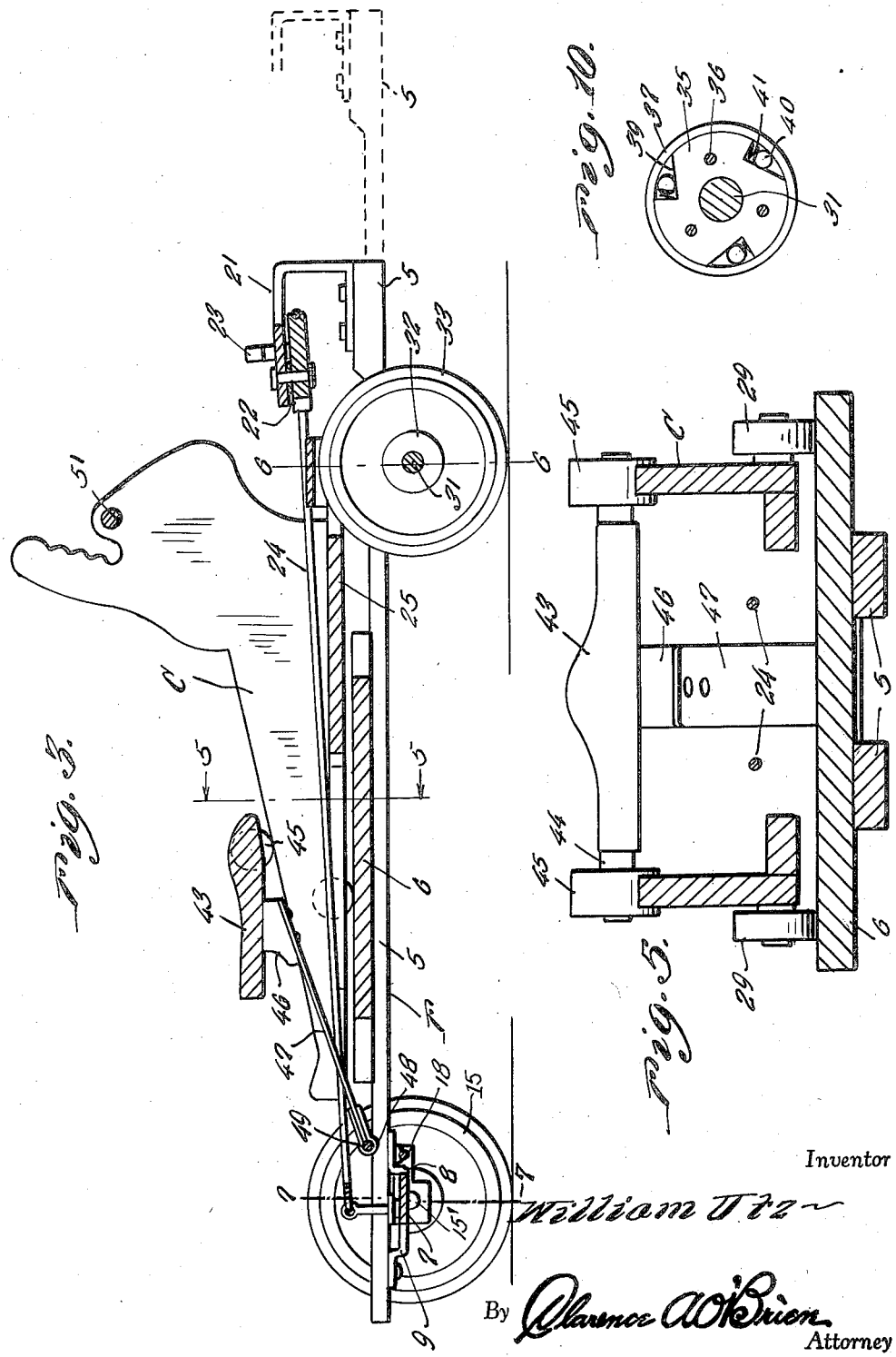

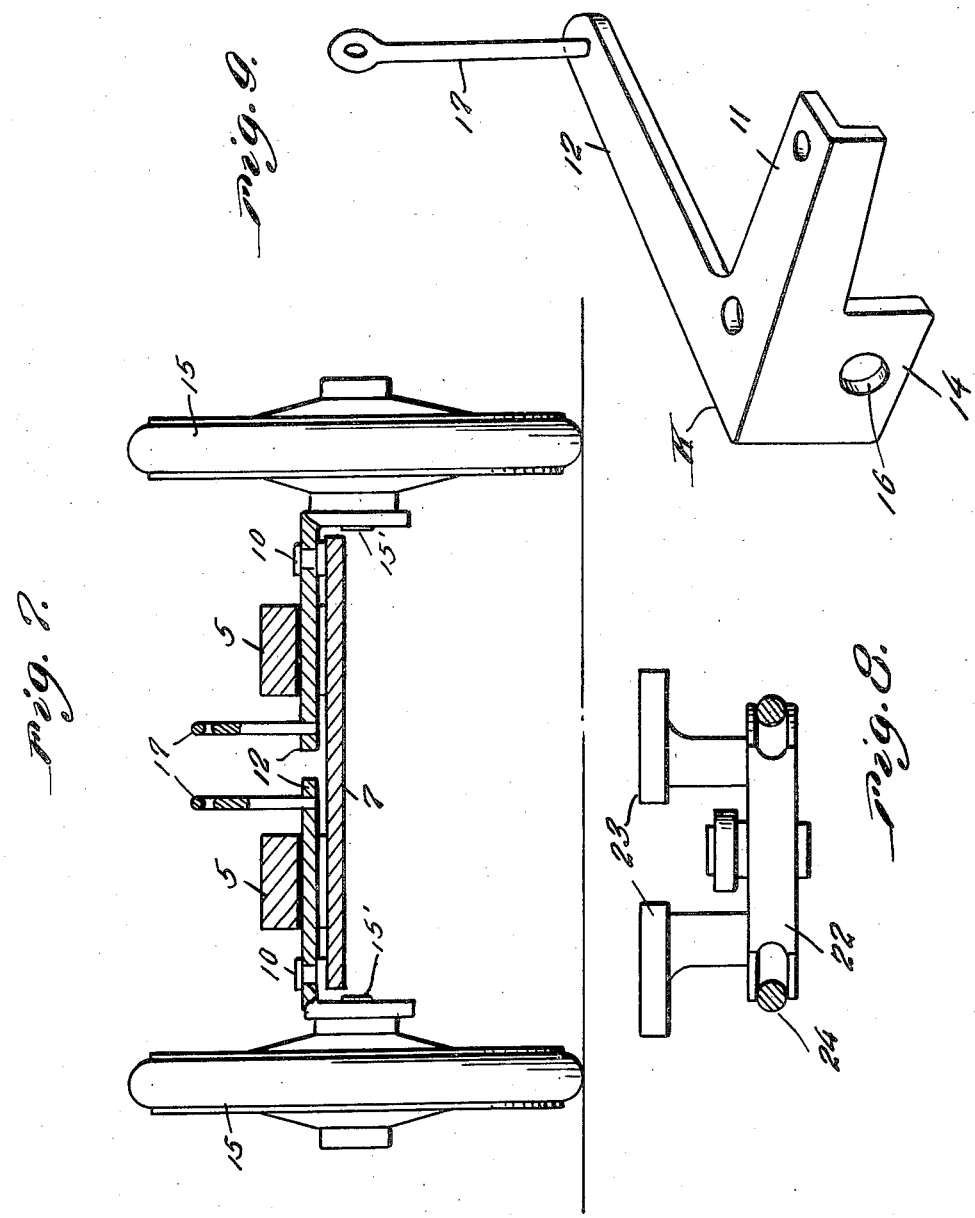

Patented Nov. 5, 1935

2,019,833

UNITED STATES PATENT OFFICE 2,019,833

OCCUPANT PROPELLED VEHICLE

William Utz, Detroit, Mich.

Application November 6, 1934, Serial No. 751,772

8 Claims. (Cl. 208—33)

The present invention relates to an occupant propelled vehicle and has for its prime object to provide a vehicle of this type having two sections reciprocably and slidably connected together in such a manner that they may be moved with respect to each other and set up motive power for the vehicle.

A further important object of the invention resides in the provision of a vehicle of this nature which is provided with a novel steering mechanism.

A still further important object of the invention resides in the provision of a vehicle of this nature which is simple in its construction, strong and durable, easy to manipulate, thoroughly efficient and reliable in use and operation, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a top plan view of a vehicle embodying the features of my invention.

Figure 2 is a side elevation thereof.

Figure 3 is a vertical longitudinal section taken substantially on the line 3—3 of Figure 1.

Figure 4 is a top plan view of the carriage.

Figure 5 is a vertical transverse section taken substantially on the line 5—5 of Figure 3.

Figure 6 is a vertical transverse section taken substantially on the line 6—6 of Figure 3.

Figure 7 is a vertical transverse section taken on the line 7—7 of Figure 3.

Figure 8 is a detail vertical transverse section taken substantially on the line 8—8 of Figure 2 looking forwardly, Figure 9 is a perspective view of one of the steering knuckles, and Figure 10 is an enlarged detail sectional view taken substantially on the line 10—10 of Figure 6.

Referring to the drawings in detail it will be seen that the letter F denotes generally a frame having a reciprocable slidable connection with a carriage C.

The frame F includes a pair of spaced parallel co-extensive stringers 5 connected by an intermediately disposed transverse platform 6 which extends out beyond the sides of the stringers. The numeral 7 denotes a cross member disposed under the rear portions of the stringers 5 and held in place by offset bracket arms 8 and 9, the former projecting forwardly and the latter rearwardly. Letters K denote a pair of steering knuckles swingable on the ends of the cross member 7 as at 10. Each steering knuckle comprises a pair of arms 11 and 12 angularly disposed. The arms 12 extend inwardly toward each other while the arms 11 extend forwardly. A flange 14 depends from the arm 11. Wheels 15' are rotatably mounted on these flanges by means of axles or spindles 15' which are fixed in openings 16 provided in the flanges 14. Rods 17 rise from the ends of the arms 12. A tie rod 18 connects the ends of the arms 11 to cause the wheels 15 to steer in unison. On the front end of the stringers 5 there is mounted an upwardly extending bracket 20 having at its upper end a rearwardly disposed extension 21 under which is rockable a segment 22 having feet engaging element 23 rising therefrom. A cable 24 has its intermediate portion trained about the segment and the ends thereof secured to the upper end of the rods 17. From the description as it has thus far progressed it will be readily seen that by properly manipulating the segment 22 with the feet engaging the elements 23 the rear wheels may be steered.

The carriage C includes a bottom 25 having sides 26 rising therefrom and it will be noted that these sides are provided with upper edges 27 which incline downwardly and rearwardly from forward points of the sides and at their bottom ends merge into relatively short upwardly and rearwardly inclined extensions 28. Wheels or rollers 29 are mounted on the bottom intermediate portions of the sides to ride on the platform 6. An inverted yoke bracket 30 is mounted on the forward end of the bottom 25 and has a fixed shaft 31 extending between the ends thereof. Rollers 32 are rotatable on the shaft and the stringers 5 ride thereon as shown to advantage in Figure 6. A wheel 33 is freely rotatable on the shaft 31 at the center thereof and has a free running clutch operatively associated therewith. The structure of the clutch may best be seen in Figure 10 and includes the disk 35 fixed as at 36 to the hub of the wheel 33 and being rotatable about the shaft 31. A drum 37 is fixed to the shaft 31 by a set screw 38 or the like and encompasses the disk. The disk 35 is provided with a plurality of peripheral notches 39 in which are located balls 40 spring pressed as at 41 toward the interior of the rim of the drum 37. It will readily be seen that the wheel may rotate freely forwardly but is prevented from rotating rearwardly because of the wedging action of the balls 40.

Numeral 43 denotes a seat and at the forward portion thereof there extends laterally therefrom a pair of fixed axles 44 on which are journalled rollers 45 to ride on the edges 27. A bracket 46 depends from the seat and is fixed to a rod 47 the lower end of which is rockable as at 48 on a cross rod 49 fixed across the rear portions of the stringers forwardly of the steering mechanism as indicated at 50.

When a person occupies the seat 43 with his feet resting on the elements 23 and his hand on the bar 51 which extends between the forward and upper end portions of the sides 26 it will be seen that he may reciprocate the carriage with respect to the frame and in so doing will impart forward movement to the vehicle because of the free running clutch A and at the same time may readily steer the vehicle.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A vehicle including, in combination, a frame, a carriage slidably mounted on the frame, wheel means supporting the frame at one end of the vehicle, wheel means supporting the carriage at the other end of the vehicle, means on the carriage and means on the frame whereby an operator positioned on the frame means and manipulating the carriage means causes the reciprocation of the frame and carriage with respect to each other, and a free running clutch operatively connected with one of the wheel means.

2. A vehicle including, in combination, a frame, a carriage slidably mounted on the frame, wheel means supporting the frame at one end of the vehicle, wheel means supporting the carriage at the other end of the vehicle, means on the carriage and means on the frame whereby an operator positioned on the frame means and manipulating the carriage means causes the reciprocation of the frame and carriage with respect to each other, a free running clutch operatively connected with one of the wheel means, said first mentioned wheel means comprising a pair of steering knuckles, a tie rod between the steering knuckles, wheels on the steering knuckles, and means for swinging the steering knuckles.

3. A vehicle including, in combination, a frame, a carriage slidably mounted on the frame, wheel means supporting the frame at one end of the vehicle, wheel means supporting the carriage at the other end of the vehicle, means on the carriage and means on the frame whereby an operator positioned on the frame means and manipulating the carriage means causes the reciprocation of the frame and carriage with respect to each other, a free running clutch operatively connected with one of the wheel means, said first mentioned wheel means comprising a pair of steering knuckles, a tie rod between the steering knuckles, wheels on the steering knuckles, a rockable member on the forward end of the frame, a cable having its intermediate portion trained over said rockable member and its ends secured to the steering knuckles so that by rocking said rockable member the steering knuckles may be swung for steering the wheels thereon.

4. A vehicle including, in combination, a frame, a carriage slidably mounted on the frame, wheel means supporting the frame at one end of the vehicle, wheel means supporting the carriage at the other end of the vehicle, said carriage having inclined portions, a seat having rollers bearing on the inclined portions, a rod fixed to the seat and swingably connected with the frame, and a free wheeling clutch operatively connected with one of the wheel means.

5. A vehicle including, in combination, a frame, a carriage slidably mounted on the frame, wheel means supporting the frame at one end of the vehicle, wheel means supporting the carriage at the other end of the vehicle, said carriage having inclined portions, a seat having rollers bearing on the inclined portions, a rod fixed to the seat and swingably connected with the frame, said second mentioned wheel means comprising an inverted yoke fixed to the forward portion of the carriage and having its sides straddling the forward portion of the frame, a fixed axle across the ends of the yoke, a wheel on said axle to rotate thereon, and a free wheeling clutch operatively connected with the wheel and the fixed axle.

6. A vehicle including, in combination, a frame, a carriage slidably mounted on the frame, wheel means supporting the frame at one end of the vehicle, wheel means supporting the carriage at the other end of the vehicle, means on the carriage and means on the frame whereby an operator positioned on the frame means and manipulating the carriage means causes the reciprocation of the frame and carriage with respect to each other, a free running clutch operatively connected with one of the wheel means, the other of said wheel means being dirigible, and means carried by the frame and connected to the dirigible wheel for steering the vehicle.

7. A vehicle comprising a frame member and a carriage member having their free confronting ends slidably overlapping each other, and wheel means on the remote ends of the carriage and frame providing supports for each end of the vehicle, one of said wheel means being dirigible and the other having a free running clutch operatively connected thereto.

8. A vehicle comprising a frame member and a carriage member having their free confronting ends slidably overlapping each other, and wheel means on the remote ends of the carriage and frame providing supports for each end of the vehicle, one of said whel means being dirigible and the other having a free running clutch operatively connected thereto, and means for reciprocating the frame and carriage with respect to each other.

WILLIAM UTZ.